(12) United States Patent
Sawchuk et al.

(10) Patent No.: US 10,365,143 B2
(45) Date of Patent: Jul. 30, 2019

(54) MEASUREMENT RING FOR FLUID FLOW IN A PIPELINE

(71) Applicant: Canada Pipeline Accessories, Co. Ltd., Calgary (CA)

(72) Inventors: Blaine Sawchuk, De Winton (CA); Reginald Selirio, Calgary (CA); Raphael Selirio, Calgary (CA); Daniel Sawchuk, Chestermere (CA)

(73) Assignee: Canada Pipeline Accessories, Co., Ltd., Calgary, Alberta (CA)

( * ) Notice: Subject to any disclaimer, the term of this patent is extended or adjusted under 35 U.S.C. 154(b) by 310 days.

(21) Appl. No.: 15/259,150

(22) Filed: Sep. 8, 2016

(65) Prior Publication Data

US 2018/0066972 A1    Mar. 8, 2018

(51) Int. Cl.
| | |
|---|---|
| *F16L 41/04* | (2006.01) |
| *F16L 41/06* | (2006.01) |
| *G01F 15/18* | (2006.01) |
| *E21B 47/10* | (2012.01) |
| *G01F 15/00* | (2006.01) |
| *G01F 1/34* | (2006.01) |

(52) U.S. Cl.
CPC ............ *G01F 15/185* (2013.01); *E21B 47/10* (2013.01); *F16L 41/04* (2013.01); *F16L 41/06* (2013.01); *G01F 15/00* (2013.01); *G01F 1/34* (2013.01)

(58) Field of Classification Search
CPC .................................................... G01F 15/185
See application file for complete search history.

(56) References Cited

U.S. PATENT DOCUMENTS

| | | |
|---|---|---|
| 3,545,492 A | 12/1970 | Scheid |
| 3,838,598 A | 10/1974 | Tompkins |
| 4,715,395 A | 12/1987 | Mainelli et al. |
| 5,327,941 A | 7/1994 | Bitsakis et al. |
| 5,341,848 A | 8/1994 | Laws |
| 5,400,828 A | 3/1995 | Ziu et al. |
| 5,495,872 A | 3/1996 | Gallagher et al. |
| 5,529,093 A | 6/1996 | Gallagher et al. |
| 5,606,297 A | 2/1997 | Phillips |
| 5,762,107 A | 6/1998 | Laws |
| 5,959,216 A | 9/1999 | Hocquet et al. |
| 6,029,912 A | 2/2000 | Woolley |

(Continued)

FOREIGN PATENT DOCUMENTS

| | | |
|---|---|---|
| CA | 2171828 | 3/1995 |
| CA | 2138686 A1 | 8/1995 |

(Continued)

OTHER PUBLICATIONS

English Abstract of FR 2233914.
English Abstract of JPS55159831.

*Primary Examiner* — Son T Le
*Assistant Examiner* — Herbert K Roberts
(74) *Attorney, Agent, or Firm* — Cahn & Samuels, LLP

(57) ABSTRACT

A measurement ring for a pipeline includes a body having a central hole extending along a longitudinal axis of the body and at least one tap for measuring fluid flow parameters in the pipeline. The at least one tap includes a threaded portion on a circumferential surface of the body extending through the body towards the central hole, and a first channel extending from the threaded portion to the central hole.

20 Claims, 3 Drawing Sheets

(56) References Cited

U.S. PATENT DOCUMENTS

| | | | |
|---|---|---|---|
| 6,145,544 | A | 11/2000 | Dutertre et al. |
| 6,463,810 | B1 * | 10/2002 | Liu .................... G01F 1/44 73/861 |
| 6,494,105 | B1 | 12/2002 | Gallagher |
| 6,612,187 | B1 | 9/2003 | Lund |
| 6,647,806 | B1 | 11/2003 | Estrada et al. |
| 6,651,514 | B2 * | 11/2003 | Zanker .................. G01F 1/42 73/861.52 |
| 6,807,986 | B2 | 10/2004 | Boger |
| 6,851,322 | B2 | 2/2005 | Gallagher |
| 7,073,534 | B2 | 7/2006 | Sawchuk et al. |
| 7,089,963 | B2 | 8/2006 | Meheen |
| 7,284,450 | B2 | 10/2007 | Orleskie et al. |
| 7,464,611 | B2 | 12/2008 | Matter et al. |
| 7,845,688 | B2 | 12/2010 | Gallagher et al. |
| 8,132,961 | B1 | 3/2012 | England et al. |
| D697,581 | S | 1/2014 | Sawchuk et al. |
| D701,939 | S | 4/2014 | Sawchuk et al. |
| 8,763,644 | B2 | 7/2014 | Tsai et al. |
| D721,417 | S | 1/2015 | Sawchuk et al. |
| 9,625,293 | B2 | 4/2017 | Sawchuk |
| 2003/0145660 | A1 * | 8/2003 | Army, Jr. ............. G01F 1/44 73/861.63 |
| 2004/0055816 | A1 | 3/2004 | Gallagher et al. |
| 2005/0092101 | A1 | 5/2005 | Bengtson |
| 2005/0178455 | A1 | 8/2005 | Cancade et al. |
| 2005/0205147 | A1 | 9/2005 | Sawchuk et al. |
| 2006/0053902 | A1 * | 3/2006 | Good .................... G01F 1/40 73/861.52 |
| 2006/0096650 | A1 | 5/2006 | Sawchuk et al. |
| 2008/0037366 | A1 | 2/2008 | Smith |
| 2008/0246277 | A1 | 10/2008 | Gallagher et al. |
| 2009/0277974 | A1 | 11/2009 | Citrawireja et al. |
| 2010/0024910 | A1 | 2/2010 | Nakamori et al. |
| 2011/0076628 | A1 | 3/2011 | Miura et al. |
| 2011/0174407 | A1 | 7/2011 | Lundberg et al. |
| 2011/0174408 | A1 | 7/2011 | Lundberg et al. |
| 2012/0247223 | A1 | 10/2012 | Sawchuk et al. |
| 2014/0110094 | A1 | 4/2014 | Pagan Duran |
| 2014/0196535 | A1 | 7/2014 | Sawchuk et al. |
| 2015/0083262 | A1 * | 3/2015 | Van Buskirk ......... F15D 1/025 138/40 |
| 2016/0061372 | A1 | 3/2016 | Sawchuk |

FOREIGN PATENT DOCUMENTS

| | | |
|---|---|---|
| CA | 2228928 | 8/1995 |
| CA | 2679650 A1 | 10/2008 |
| CA | 2787659 | 7/2011 |
| CA | 2771728 A1 | 9/2012 |
| FR | 2233914 A5 | 10/1975 |
| GB | 1469648 | 4/1977 |
| JP | 55159831 S | 12/1980 |
| WO | 2014040191 A1 | 3/2014 |
| WO | 2014110673 A1 | 7/2014 |
| WO | 2014186883 A1 | 11/2014 |

\* cited by examiner

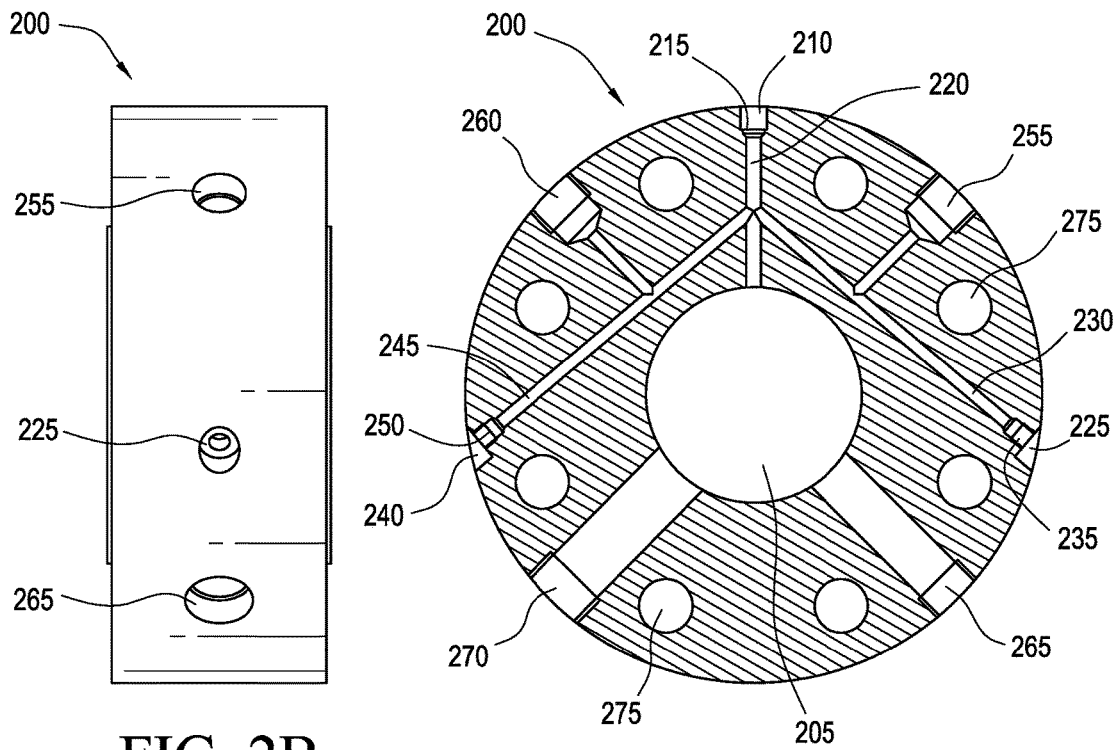
FIG. 2B
FIG. 2A
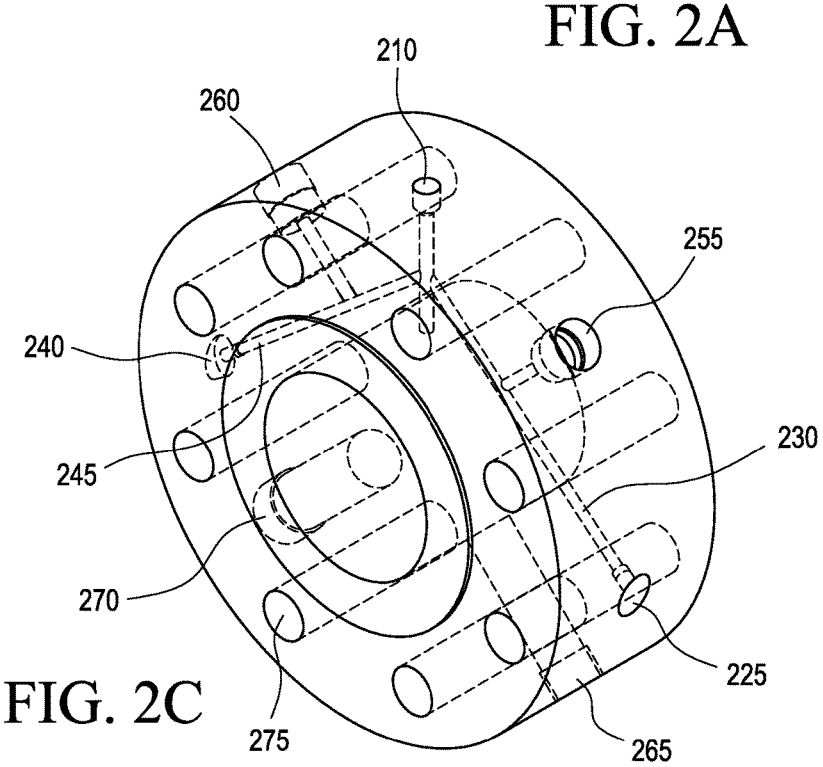
FIG. 2C

MEASUREMENT RING FOR FLUID FLOW IN A PIPELINE

FIELD OF INVENTION

The present invention relates to a device used in oil, gas, and water pipelines. More particularly, the present invention relates to a measurement ring comprising one or more taps for accessing fluid flow within a pipeline and to a method for performing measurements via the measurement ring.

BACKGROUND OF THE INVENTION

Pipelines are used to transport fluids in various industries, including chemical, oil and gas, and manufacturing. These industries use processes that require fluid flow parameters, such as gas composition, pressure, temperature, viscosity, and the like, to be accurately measured.

Current methods for measuring flow within a pipeline include welding a fitting or branch connection onto a pipe, for example a Thredolet® or Weldolet® from Bonney Forge®. However, there remains a need for an apparatus to allow efficient and cost effective gathering and measuring of fluid flow parameters within a pipeline.

SUMMARY OF THE INVENTION

A measurement ring for a pipeline according to a first embodiment of the present invention includes a body having a central hole extending along a longitudinal axis of the body and at least one tap for measuring at least one fluid flow parameter in the pipeline. The at least one tap comprises a threaded portion on a circumferential surface of the body extending through the body towards the central hole and a first channel extending from the threaded portion to the central hole.

A measurement ring for a pipeline according to another embodiment further to any of the previous embodiments includes a second channel branching off the first channel and extending through the body to a threaded portion of a second tap on the circumferential surface of the body.

A measurement ring for a pipeline according to another embodiment further to any of the previous embodiments includes one or more ports or bores that accommodate equipment.

A measurement ring for a pipeline according to another embodiment further to any of the previous embodiments includes a body having a plurality of evenly spaced holes parallel to the central hole.

A pipe assembly according to an embodiment of the present invention includes a fluid flow pipe and a measurement ring according to any of the previous embodiments disposed in the fluid flow pipe in an orientation substantially perpendicular to a longitudinal axis of the fluid flow pipe.

A method of measuring a fluid parameters within a fluid flow pipe includes measuring a fluid within the fluid flow pipe with the least one tap of a measurement ring according to any of the previous embodiments.

An advantage of the measurement ring of the present invention is that it allows efficient and cost effective gathering and measuring of fluid flow parameters within a pipeline without having to cut into or tap a pipe wall itself.

Another advantage of the measurement ring of the present invention is that welding of the measurement ring onto a pipe is not required.

Another advantage of the present invention is that it allows for a standardized tap layout, which provides consistent readings that can be verified with baseline test data at a test lab using the same correction factor.

As used herein "substantially", "relatively", "generally", "about", and "approximately" are relative modifiers intended to indicate permissible variation from the characteristic so modified. They are not intended to be limited to the absolute value or characteristic which it modifies but rather approaching or approximating such a physical or functional characteristic.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Given the following enabling description of the drawings, the methods and systems should become evident to a person of ordinary skill in the art.

BRIEF DESCRIPTION OF THE DRAWINGS

FIG. 2A illustrates a cut-away front view of a first side of a measurement ring according to another embodiment of the present invention.

FIG. 2B illustrates a side view of the measurement ring according to FIG. 2A.

FIG. 2C illustrates a perspective view of the measurement ring according to FIG. 2A showing a partial phantom interior view.

Figure 1B:
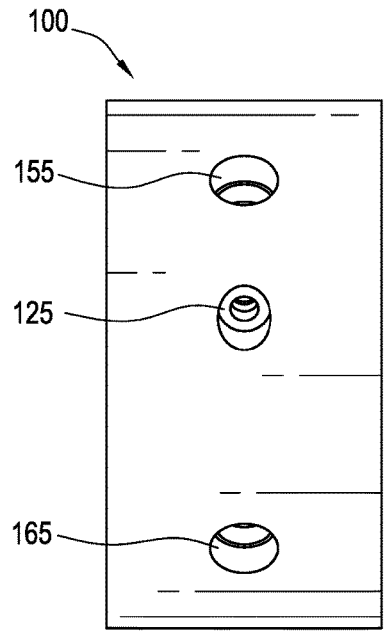
FIG. 1B illustrates a side view of the measurement ring according to FIG. 1A.

Given the following enabling description of the drawings, the methods and systems should become evident to a person of ordinary skill in the art.

DETAILED DESCRIPTION OF THE INVENTION

The measurement ring according to the present invention may be utilized for measuring flow parameters, for example, in oil, gas, or water pipelines. The measurement ring comprises at least one tap that is integral with the measurement ring. Thus, the at least one tap may be machined or drilled out of the same material as the measurement ring and is physically part of the measurement ring. The at least one tap is not separately attached or connected to the measurement ring, for example, via a weld, adhesive, or other connection. Moreover, the measurement ring itself does not have to be welded onto a pipeline.

According to the present invention, a measurement ring comprises a body having a central hole extending along a longitudinal axis of the body. The measurement ring may be bolted onto a pipe at any desire location, for example, in a metering run, at the end of a metering run, between separators, or between flanges, orifice plate fitting or orifice flange unions. The measurement ring is sized or selected so that the central hole has a diameter substantially the same as an inner pipe diameter of the fluid flow pipe to which it is connected. In specific embodiments, the central hole may have a diameter of about 2 inches to 24 inches, for example, 4 inches to 16 inches.

According to the present invention, the measurement ring has at least one tap for accessing and measuring fluid within the central hole and therefore within a fluid flow pipeline. The at least one tap comprises 1) a threaded portion on a circumferential surface of the measurement ring extending towards the central hole and 2) a first channel extending from the threaded portion to the central hole, or in the event of multiple taps, may also include a connection to another channel. The at least one tap may be configured to comply with National Pipe Thread (NPT) or other industry standard connections.

In a specific embodiment, the at least one tap may comprise a pressure tap comprising a tube or sleeve that is connected to a pressure reading device or pressure gauge via an electronic line or wireless connection and is capable of taking pressure measurements of fluid flow within a pipeline.

In a specific embodiment, the at least one tap may be configured so that it can accommodate a valve, such as a needle valve, to block one or more channels.

According to an embodiment of the present invention, the measurement ring may have two or more taps, for example 3-8 taps. Thus, in addition to the at least one tap noted above, the measurement ring may comprise a second channel branching off the first channel and extending through the body to a threaded portion of a second tap. Likewise, the measurement ring may comprise a third channel branching off the first channel and extending through the body to a threaded portion of a third tap. Additional taps may be configured to tap the second channel or the third channel, respectively.

According to the present invention, the measurement ring may also have one or more ports or bores that can accommodate equipment including, but not limited to, a thermowell, a temperature probe, a transducer, sensor, ultrasonic meter, gauges, or any combination thereof. In a specific embodiment, the equipment may be connected to a measurement device via an electronic line or wireless connection and is capable of taking measurements of fluid flow within a pipeline. The one or more ports or bores may be larger in size that the at least one tap and may be located on a bottom portion of the measurement ring.

In embodiments, the measurement ring may have holes extending longitudinally through the body and parallel to the central hole for attaching the measurement ring to a pipe. For example, the measurement ring may have a plurality of evenly-spaced bolt holes.

The measurement ring, at least one tap and channels, may be configured in specific embodiments to pressures corresponding to American National Standards Institute (ANSI) Pressure Class No. 150 to 900. The measurement ring may be of any suitable dimensions. In a specific embodiment, the measurement ring may have a width (diameter) of about 5 to 30 inches, for example 7 to 10 inches, and a length of about 2 to 10 inches, for example, 4 to 6 inches.

Figure 1A:
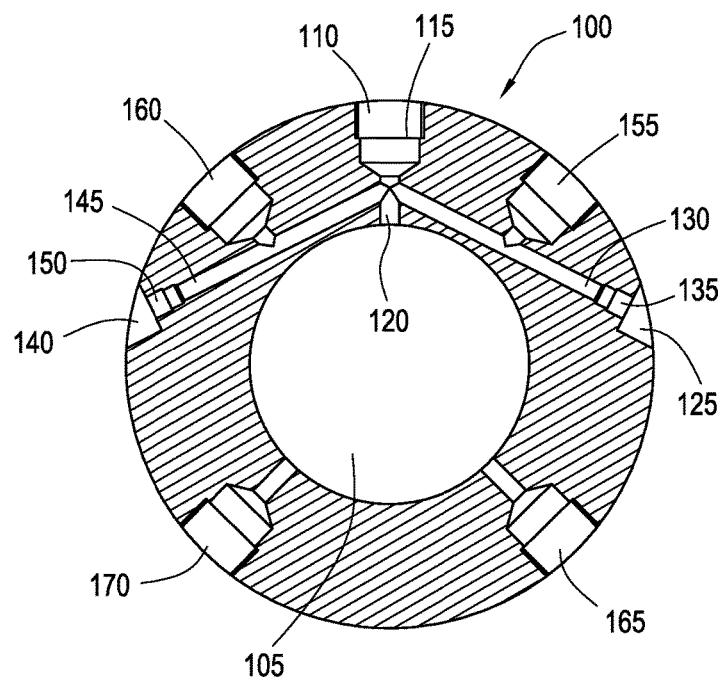
FIG. 1A illustrates a cut-away front view of a first side of a measurement ring according to one embodiment of the present invention.

As shown in FIG. 1A, a measurement ring 100 according to one embodiment of the present invention comprises a body having a central hole 105 and a first tap 110 having a threaded portion 115 on a circumferential surface of the measurement ring extending towards the central hole and a channel 120 extending from the threaded portion 115 to the central hole 105.

A second tap 125 comprises a second channel 130 branching off the first channel 120 and extending through the body to a threaded portion 135 of the second tap 125. A third tap 140 comprises a third channel 145 branching off the first channel 120 and extending through the body to a threaded portion 150 of the third tap. Additional fourth and fifth taps 155, 160 are configured to tap the second channel 130 or the third channel 145, respectively, and have a similar threaded portion/channel structure. Sixth and seventh taps 165, 170 have the same structure as the first tap and extended from respective threaded portions and channels to the central hole 105.

Figure 1C:
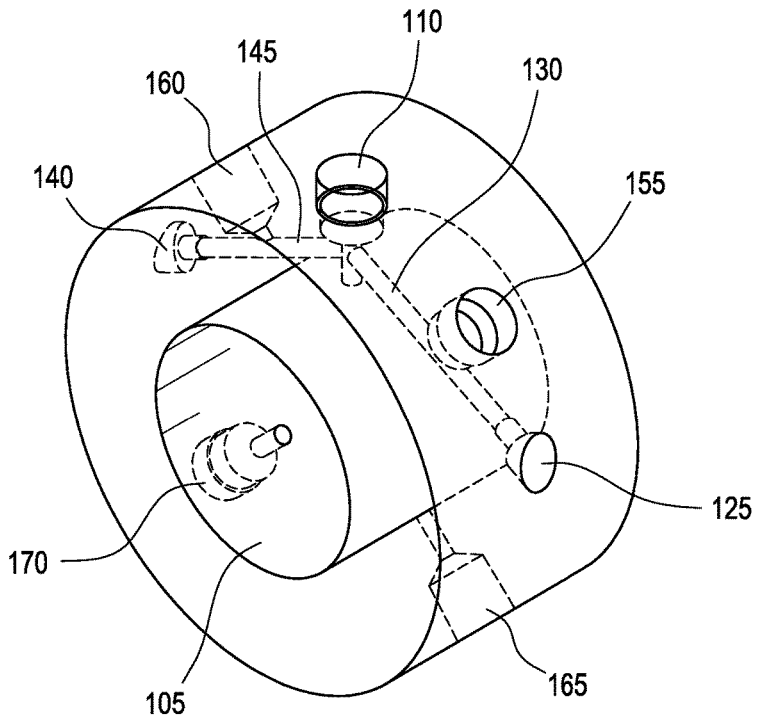
FIG. 1C illustrates a perspective view of the measurement ring according to FIG. 1A showing a partial phantom interior view.

FIG. 1B illustrates a side view of the measurement ring according to FIG. 1A. FIG. 1C illustrates a perspective view of the measurement ring according to FIG. 1A showing a partial phantom interior view.

As shown in FIG. 2A, a measurement ring 200 according to another embodiment of the present invention comprises a body having a central hole 205 and a first tap 210 having a threaded portion 215 on a circumferential surface of the measurement ring extending towards the central hole and a channel 220 extending from the threaded portion 215 to the central hole 205.

A second tap 225 comprises a second channel 230 branching off the first channel 220 and extending through the body to a threaded portion 235 of the second tap 225. A third tap 240 comprises a third channel 245 branching off the first channel 220 and extending through the body to a threaded portion 250 of the third tap 240. Additional fourth and fifth taps 255, 260 are configured to tap the second channel 230 or the third channel 245, respectively, and have a similar threaded portion/channel structure.

The measurement ring 200 includes two ports or bores, 265, 270 that can each accommodate equipment. The measurement ring 200 also comprises a plurality of holes 275, e.g., bolt holes, for bolting the measurement ring onto a pipe at any desired location.

FIG. 2B illustrates a side view of the measurement ring according to FIG. 2A. FIG. 2C illustrates a perspective view of the measurement ring according to FIG. 2A showing a partial phantom interior view.

Figure 2D:
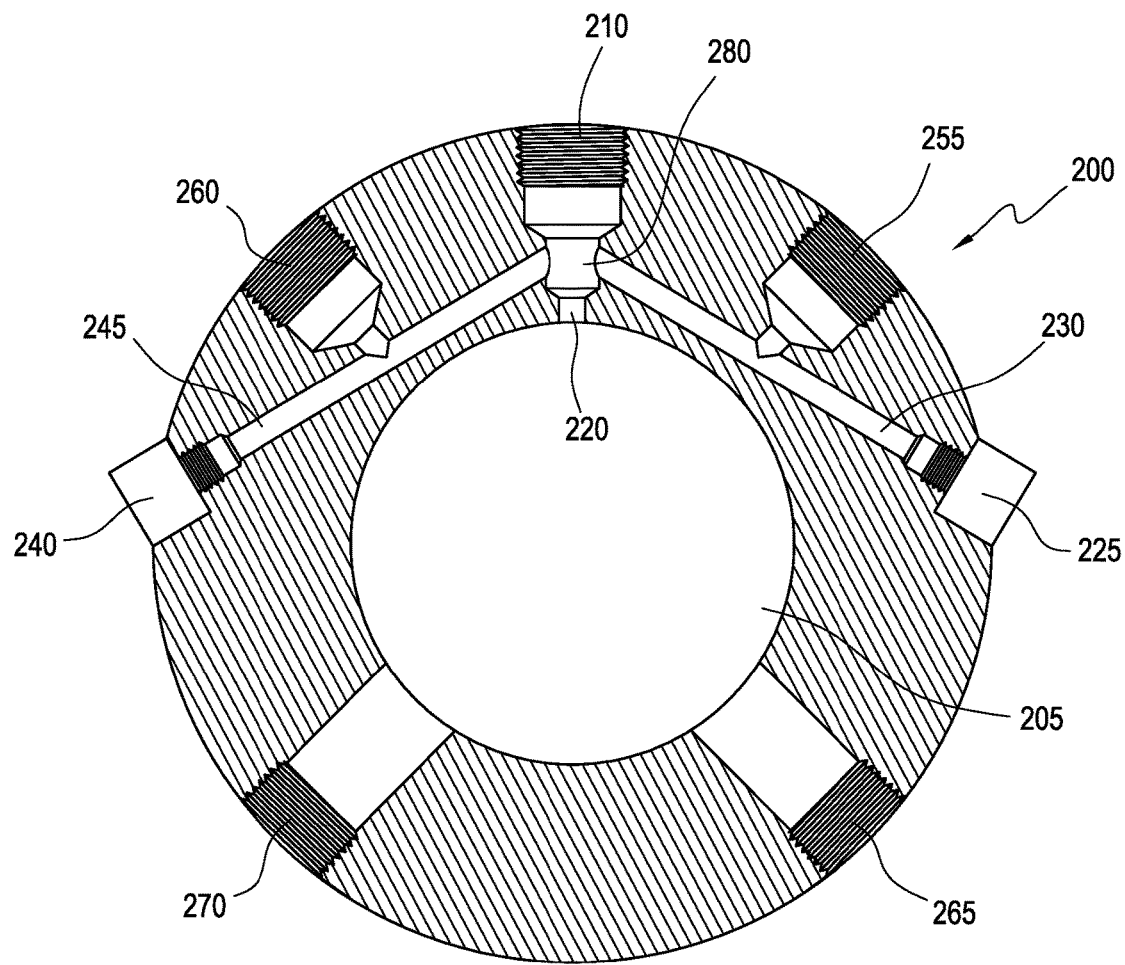
FIG. 2D illustrates a schematic cut-away front view of the measurement ring similar to FIG. 2A showing a valve on a tap.

FIG. 2D illustrates a schematic front view of the measurement ring similar to FIG. 2A in which corresponding structures have the same reference numerals. Valve 280 of top tap 210 is capable of blocking first channel 220, second channel 230, third channel 245, or any combination thereof.

Figure 3:
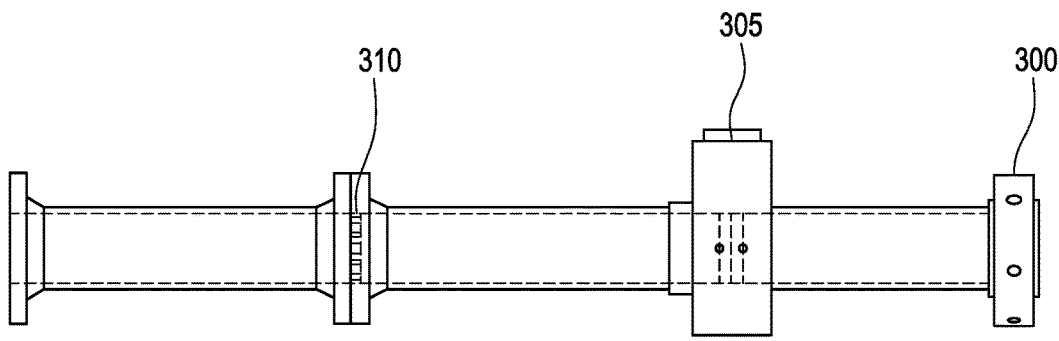
FIG. 3 illustrates a schematic view of a fluid flow pipe with a measurement ring attached.

FIG. 3 illustrates a schematic view of a fluid flow pipe according to one embodiment of the present invention with a measurement ring 300 attached. The measurement ring 300 is installed downstream of flow meter 305. The measurement ring may be at any distance downstream of meter 305, for example 1D to 10D, or 2D to 5D, where D is the internal pipe diameter. There may also be a separate flow conditioner 310 upstream of flow meter 305. Suitable flow conditioners include, but are not limited to, CPA TBR, CPA 50E, CPA 55E®, CPA 60E®, CPA 65E® flow conditioners, available from Canada Pipeline Accessories, Inc. of Calgary, Canada.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

The invention claimed is:

1. A measurement ring, comprising:
a body having a central hole extending along a longitudinal axis of the body;
a first tap for measuring at least one fluid flow parameter in a pipeline, said first tap comprising:
a first threaded portion on a circumferential surface of the body extending through the body towards the central hole and
a first channel extending from the first threaded portion to the central hole;
a second tap comprising:
a second channel branching off the first channel and extending through the body to a second threaded portion on the circumferential surface of the body; and
a third tap comprising:
a third channel branching off the first channel and extending through the body to a third threaded portion on the circumferential surface of the body,
wherein the measurement ring is configured to be fitted within the pipeline and an entirety of each of the first tap, the second tap, and the third tap is integrated within the body.

2. The measurement ring according to claim 1, further comprising:
a fourth tap comprising a fourth threaded portion on the circumferential surface of the body and a fourth channel extending from the fourth threaded portion to the second or third channel.

3. The measurement ring according to claim 2, further comprising:
a fifth tap comprising a fifth threaded portion on the circumferential surface of the body and a fifth channel extending from the fifth threaded portion to the second or third channel.

4. The measurement ring according to claim 1, wherein the first tap comprises a pressure tap capable of taking pressure measurements of fluid flow within the pipeline.

5. The measurement ring according to claim 1, further comprising:
one or more ports or bores that accommodate equipment.

6. The measurement ring according to claim 5, wherein the equipment includes at least one of a thermowell, a temperature probe, a transducer, sensor, ultrasonic meter, and gauges.

7. The measurement ring according to claim 1, wherein said body further comprises at least one hole parallel to the central hole.

8. The measurement ring according to claim 7, wherein said body comprises a plurality of evenly-spaced holes parallel to the central hole for receiving bolts.

9. The measurement ring according to claim 1, wherein at least one of the first tap, second tap, or third tap comprises a valve for blocking at least one channel.

10. The measurement ring according to claim 1, wherein the central hole has a diameter of about 2 inches to 24 inches.

11. A pipe assembly for flow measurement, comprising:
a fluid flow pipe of a pipeline; and
a measurement ring according to claim 1 integrated with said fluid flow pipe in an orientation substantially perpendicular to a longitudinal axis of said fluid flow pipe.

12. The pipe assembly according to claim 11, wherein said measurement ring is bolted onto the fluid flow pipe so that there is no cut or weld connection on the fluid flow pipe wall.

13. The pipe assembly according to claim 12, wherein said measurement ring is bolted onto the fluid flow pipe at a position selected from the group consisting of in a metering run, at the end of a metering run, between separators, between flanges, between orifice plate fittings and between or orifice flange unions.

14. The pipe assembly according to claim 11, further comprising:
a flow meter,
wherein said measurement ring is downstream of the flow meter.

15. The pipe assembly according to claim 14, further comprising:
a flow conditioner upstream of the flow meter.

16. The pipe assembly according to claim 11, wherein said measurement ring is sized so that the central hole has a diameter substantially the same as an inner pipe diameter of the fluid flow pipe.

17. The pipe assembly according to claim 11, wherein the central hole has a diameter of about 2 inches to 24 inches.

18. A method of measuring at least one fluid parameter within a fluid flow pipe comprising:
measuring a fluid within the fluid flow pipe with at least one tap of a measurement ring according to claim 1.

19. The measurement ring according to claim 1, wherein the at least one tap comprises a valve for blocking at least one channel.

20. The measurement ring according to claim 1, wherein the central hole is unobstructed across the diameter of the central hole along an entirety of the longitudinal axis of the body.

* * * * *